(12) United States Patent
Otsuka

(10) Patent No.: US 12,735,267 B2
(45) Date of Patent: Sep. 15, 2026

(54) TRANSPORT VEHICLE

(71) Applicant: Daifuku Co., Ltd., Osaka (JP)

(72) Inventor: Hiroshi Otsuka, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 593 days.

(21) Appl. No.: 18/219,861

(22) Filed: Jul. 10, 2023

(65) Prior Publication Data

US 2024/0010250 A1 Jan. 11, 2024

(30) Foreign Application Priority Data

Jul. 11, 2022 (JP) ................................ 2022-111380

(51) Int. Cl.

| | |
|---|---|
| ***B65G 35/06*** | (2006.01) |
| ***B60W 10/119*** | (2012.01) |
| ***B61B 3/02*** | (2006.01) |
| ***B61L 27/04*** | (2006.01) |
| ***B65G 1/04*** | (2006.01) |
| ***B65G 35/00*** | (2006.01) |

(52) U.S. Cl.

CPC ........... *B65G 35/06* (2013.01); *B60W 10/119* (2013.01); *B61B 3/02* (2013.01); *B61L 27/04* (2013.01); *B65G 1/0457* (2013.01); *B65G 35/00* (2013.01); *B60W 2520/26* (2013.01); *B60W 2720/30* (2013.01); *B61L 2201/00* (2013.01); *B65G 2201/02* (2013.01)

(58) Field of Classification Search

CPC ....... B60W 2720/30; B60W 2720/106; B60W 10/04; B60W 2520/26; B60W 10/119; B61B 3/02; B61L 15/0081; B61L 2201/00; B61L 27/04; B65G 1/0457; B65G 2201/02; B65G 35/00; B65G 35/06

See application file for complete search history.

(56) References Cited

U.S. PATENT DOCUMENTS 8,849,538 B2 * 9/2014 Kato ........................ B60L 9/18 701/84
10,583,824 B2 * 3/2020 Sasaki .................. B60K 17/046
11,634,113 B2 * 4/2023 Shin ...................... B60W 50/00 701/22

(Continued)

FOREIGN PATENT DOCUMENTS

JP 200541383 A 2/2005
JP 2008140145 A 6/2008

(Continued)

*Primary Examiner* — Cheng Lin
(74) *Attorney, Agent, or Firm* — The Webb Law Firm

(57) ABSTRACT

A transport vehicle includes a body including a first wheel and a second wheel, a first drive device that drives the first wheel, a second drive device that drives the second wheel, and a control device, the control device controlling the first drive device and the second drive device in such a manner that a torque ratio of a wheel with increased load, which is a ratio of a torque transmitted to the wheel with increased load to a sum of a first wheel torque and a second wheel torque, is higher while the body is accelerating and decelerating than while the body is traveling at constant velocity, where the wheel with increased load is one of the first wheel and the second wheel that is subjected to an increase in vertical downward load that increases in response to acceleration or deceleration of the body.

8 Claims, 5 Drawing Sheets

(56) References Cited

U.S. PATENT DOCUMENTS

| | | | | |
|---|---|---|---|---|
| 12,269,478 | B2 * | 4/2025 | Choi | B60W 40/068 |
| 2007/0239340 | A1 * | 10/2007 | Miura | B60W 40/107<br>701/70 |
| 2008/0128191 | A1 * | 6/2008 | Kubo | B60L 15/2009<br>701/69 |
| 2014/0121870 | A1 * | 5/2014 | Lee | B60W 30/16<br>477/3 |
| 2019/0389305 | A1 * | 12/2019 | Shimizu | B60T 8/32 |
| 2022/0126699 | A1 * | 4/2022 | Lee | B60L 15/2036 |

FOREIGN PATENT DOCUMENTS

| | | | | | |
|---|---|---|---|---|---|
| JP | 2010282569 | A | | 12/2010 | |
| JP | 2018122700 | A | * | 8/2018 | B65G 35/06 |
| JP | 202270842 | A | | 5/2022 | |
| KR | 20160132699 | A | * | 11/2016 | B60W 20/00 |
| SG | 10201605312X | | * | 1/2017 | B65G 35/00 |

* cited by examiner

10
CONTROL DEVICE
FIRST DRIVE DEVICE
2
SECOND DRIVE DEVICE
3

X
X1
X2
α
WB
12(W)
11
WB2
5
Z1
Z
Z2
1
H
P1
P2
G
α
13
A
M

X
X1
X2
α
WB
12
11(W)
WB2
5
Z1
Z
Z2
1
H
P2
P1
α
G
13
A
M

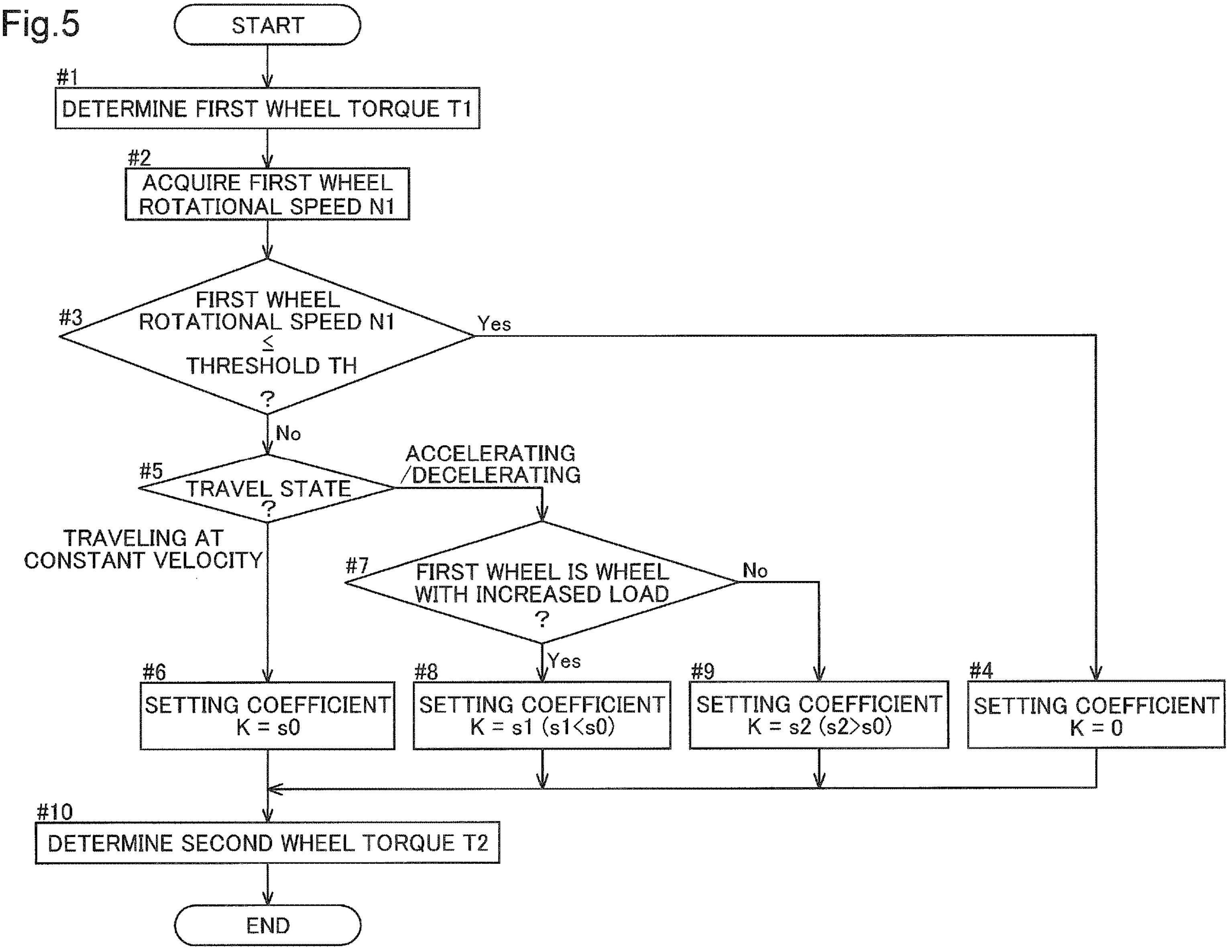
Fig.5
START
#1
DETERMINE FIRST WHEEL TORQUE T1
#2
ACQUIRE FIRST WHEEL ROTATIONAL SPEED N1
#3
FIRST WHEEL ROTATIONAL SPEED N1 ≤ THRESHOLD TH ?
Yes
No
#5
TRAVEL STATE ?
ACCELERATING /DECELERATING
TRAVELING AT CONSTANT VELOCITY
#7
FIRST WHEEL IS WHEEL WITH INCREASED LOAD ?
No
Yes
#6
SETTING COEFFICIENT K = s0
#8
SETTING COEFFICIENT K = s1 (s1<s0)
#9
SETTING COEFFICIENT K = s2 (s2>s0)
#4
SETTING COEFFICIENT K = 0
#10
DETERMINE SECOND WHEEL TORQUE T2
END VELOCITY
V
0
ACCELERATION
α
0
SETTING COEFFICIENT
K
s0
0
P2
WHEEL LOAD
P1
0
R
TORQUE RATIO
OF WHEEL WITH INCREASED LOAD
0
t1
t2
TIME VELOCITY
V
0
0
ACCELERATION
α
s0
SETTING COEFFICIENT
K
0
P1
WHEEL LOAD
P2
0
TORQUE RATIO
OF WHEEL WITH INCREASED LOAD
R
0
t3
t4
TIME

TRANSPORT VEHICLE

CROSS-REFERENCE TO RELATED APPLICATION

This application claims priority to Japanese Patent Application No. 2022-111380 filed Jul. 11, 2022, the disclosure of which is hereby incorporated by reference in its entirety.

BACKGROUND OF THE INVENTION

1. Field of the Invention

The present invention relates to a transport vehicle that travels along travel rails.

2. Description of the Related Art

An example of such a transport vehicle is disclosed in JP 2010-282569A (Patent Document 1). Hereinafter, in the description of the related art, reference numerals of Patent Document 1 are cited in parentheses.

A transfer vehicle (3) of Patent Document 1 is provided with a body (18, 19) including first wheels (25, 28) and second wheels (36, 37) that are disposed at different positions to each other in the travel direction and roll on travel rails (4), drive devices (26, 29) that drive the first wheels (25, 28), and a control device (59) that controls the drive devices. The control device (59) generates a velocity pattern (see FIG. 5 of Patent Document 1) based on a target position of the body (18, 19), and controls the drive devices (26, 29) in accordance with the velocity pattern.

Incidentally, while the body (18, 19) is accelerating or decelerating, a vertical downward load on one of the first wheels (25, 28) and the second wheels (36, 37) increases, and the vertical downward load on the other of the first wheels (25, 28) and the second wheels (36, 37) decreases. As a result, wheel slippage increases and may contribute to the occurrence of dust particles.

SUMMARY OF THE INVENTION

In view of the foregoing, it is desired to realize a transport vehicle capable of suppressing wheel slippage while the body is accelerating or decelerating.

A characteristic configuration of a transport vehicle arrived at in view of the above is as follows:

A transport vehicle configured to travel in a travel direction along a travel rail, including:

- a body including a first wheel and a second wheel disposed at different positions to each other in the travel direction and configured to roll on the travel rail;
- a first drive device configured to drive the first wheel;
- a second drive device configured to drive the second wheel; and
- a control device configured to control the first drive device and the second drive device, wherein the control device controls the first drive device and the second drive device in such a manner that a torque ratio of a wheel with increased load, which is a ratio of a torque transmitted to the wheel with increased load to a sum of a first wheel torque and a second wheel torque, is higher while the body is accelerating and decelerating than while the body is traveling at constant velocity, where the first wheel torque is a torque transmitted from the first drive device to the first wheel, the second wheel torque is a torque transmitted from the second drive device to the second wheel, and the wheel with increased load is one of the first wheel and the second wheel that is subjected to an increase in vertical downward load that increases in response to acceleration or deceleration of the body.

According to this characteristic configuration, the first wheel torque and the second wheel torque can be appropriately controlled, in response to an increase or decrease in the vertical downward loads acting on the first wheels and the second wheels while the body is accelerating or decelerating. Wheel slippage is thereby readily suppressed while the body is accelerating or decelerating. Also, acceleration or deceleration of the body is readily performed with large changes in velocity, thus readily enhancing the efficiency with which articles are transported.

BRIEF DESCRIPTION OF THE DRAWINGS

FIG. 5 is a flowchart showing an example of control processing by a control device.

DESCRIPTION OF THE INVENTION

Figures 1, 2:
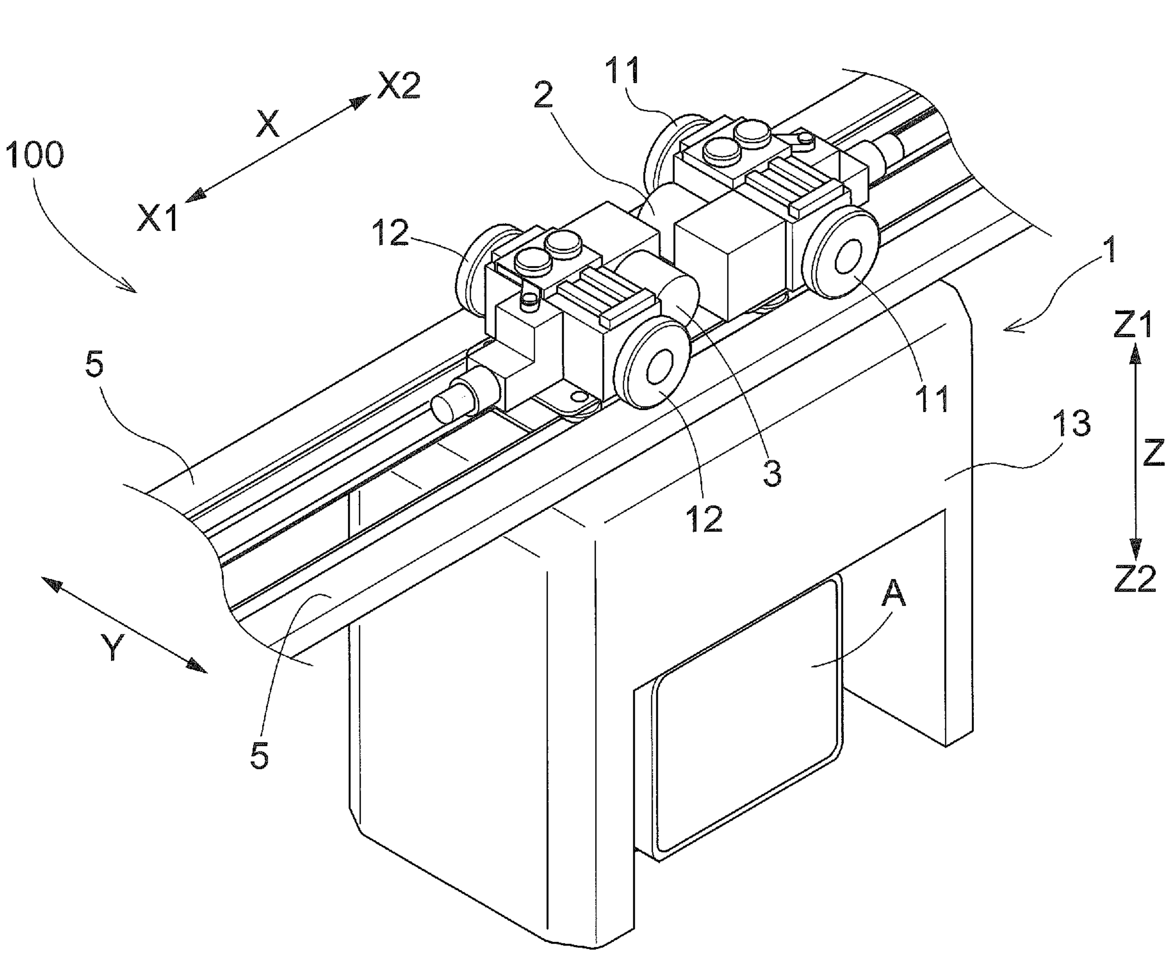
FIG. 1 is a perspective view of a transport vehicle according to an embodiment.
FIG. 2 is a control block diagram of the transport vehicle according to the embodiment.

Hereinafter, a transport vehicle 100 according to an embodiment will be described with reference to the drawings. As shown in FIG. 1, the transfer vehicle 100 travels along a travel rail 5. In the present embodiment, the transport vehicle 100 is an overhead transport vehicle that travels along the travel rail 5 which is supported in a state suspended from the ceiling.

Here, the travel rail 5 extends in a front-rear direction X. That is, the front-rear direction X is the direction in which the transport vehicle 100 travels. The front side of the transport vehicle 100 in the travel direction is given as "front side X1", and the rear side of the transfer vehicle 100 in the travel direction is given as "rear side X2". The direction orthogonal to the front-rear direction X when viewed vertically from above is given as "width direction Y". Also, the direction vertically up and down is given as "up-down direction Z". Further, the upper side in the vertical direction is given as "upper side Z1", and the lower side in the vertical direction is given as "lower side Z2".

As shown in FIG. 1, the transport vehicle 100 is provided with a body 1. The body 1 is provided with a first wheel 11 and a second wheel 12. The first wheel 11 and the second wheel 12 roll on the travel rail 5. The first wheel 11 and the second wheel 12 are disposed at different positions to each other in the front-rear direction X. In the present embodiment, the first wheel 11 is disposed on the rear side X2 with respect to the second wheel 12. That is, in the present embodiment, the first wheel 11 is a rear wheel and the second wheel 12 is a front wheel.

In the present embodiment, a pair of travel rails 5 are spaced apart from each other in the width direction Y. Thus, in the present embodiment, a pair of first wheels 11 and a pair of second wheels 12 are disposed to roll on the pair of travel rails 5.

In the present embodiment, the body 1 is further provided with a holding section 13 that holds an article A to be transported. In the present embodiment, the holding section 13 is disposed and supported on the lower side Z2 with respect to the travel rails 5. The holding section 13 supports the article Ain a suspended state.

As shown in FIG. 1, the transfer vehicle 100 includes a first drive device 2 and a second drive device 3. The first drive device 2 drives the first wheels 11. The second drive device 3 drives the second wheels 12. The first drive device 2 and the second drive device 3 both include a motor such as a servo motor and an axle that is driven by the motor, for example. Also, the first drive device 2 and the second drive device 3 may both include a reduction gear or the like that reduces and transmits the output rotation of the motor to the wheels.

As shown in FIG. 2, the transport vehicle 100 is provided with a control device 10. The control device 10 controls the first drive device 2 and the second drive device 3. In the present embodiment, the control device 10 is provided in the body 1. The control device 10 may also be a combination of a first control device that is provided in the body 1 and a second control device (e.g., higher-level controller) that is provided separately from the body 1 and can communicate with the first control device.

Figures 3, 4:
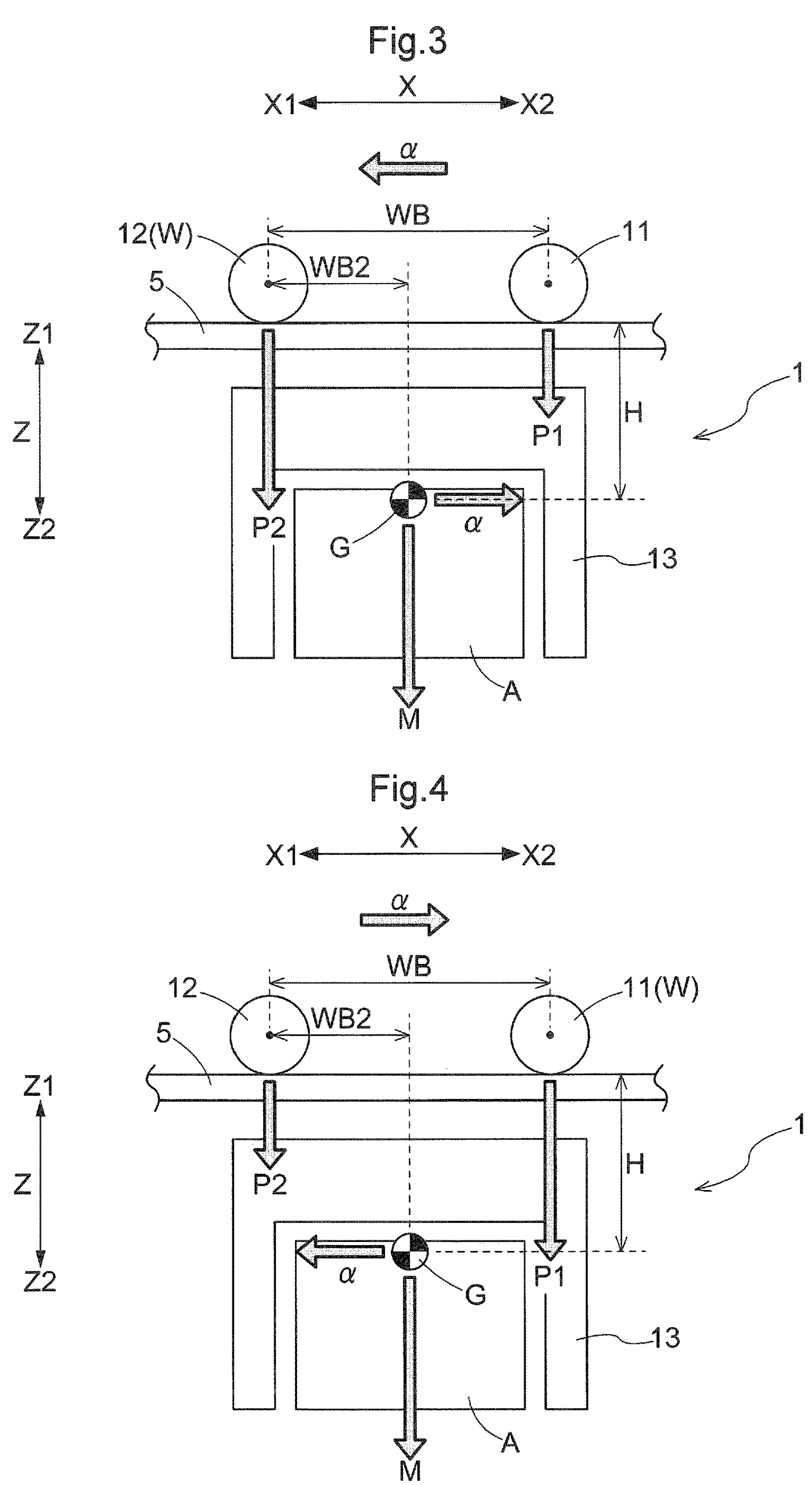
FIG. 3 is a schematic diagram showing acceleration of the body of the transport vehicle according to the embodiment.
FIG. 4 is a schematic diagram showing deceleration of the body of the transport vehicle according to the embodiment.

Here, the case where the body 1 traveling toward the front side X1 accelerates or decelerates will be described. As shown in FIG. 3, while the body 1 is accelerating, that is, while acceleration α of the body 1 is larger than zero, an inertia force toward the rear side X2 acts on a center of gravity G of the body 1. On the other hand, as shown in FIG. 4, while the body 1 is decelerating, that is, while the acceleration α of the body 1 is smaller than zero, an inertia force toward the front side X1 acts on the center of gravity G of the body 1.

As shown in FIGS. 3 and 4, in the present embodiment, the center of gravity G of the body 1 while the holding section 13 is holding the article A is on the lower side Z2 with respect to the travel rails 5. In such a configuration, while the body 1 traveling toward the front side X1 is accelerating, a vertical downward load P2 acting on the second wheels 12 (load toward the lower side Z2) increases, and the vertical downward load P1 acting on the first wheels 11 decreases, as shown in FIG. 3. Also, while the body 1 traveling toward the front side X1 is decelerating, the vertical downward load P1 acting on the first wheels 11 increases and the vertical downward load P2 acting on the second wheels 12 decreases, as shown in FIG. 4. Note that, in the present embodiment, the center of gravity G of the body 1 is on the lower side Z2 with respect to the travel rails 5, even while the holding section 13 is not holding the article A.

In the following description, one of the first wheels 11 and the second wheels 12 that is subjected to an increase in vertical downward load in response to acceleration or deceleration of the body 1 is given as "wheels W with increased load". In the present embodiment, while the body 1 is accelerating, one of the first wheels 11 and the second wheels 12 that is on the front side X1 (here, second wheels 12) corresponds to the wheels W with increased load. Also, while the body 1 is decelerating, one of the first wheels 11 and the second wheels 12 that is on the rear side X2 (here, first wheels 11) corresponds to the wheels W with increased load.

FIG. 5 is a flowchart showing an example of control processing by the control device 10. In the following description, torque that is transmitted from the first drive device 2 to the first wheels 11 is given as "first wheel torque T1", and torque that is transmitted from the second drive device 3 to the second wheels 12 is given as "second wheel torque T2".

As shown in FIG. 5, the control device 10, first, determines the first wheel torque T1 based on at least either a target position or a target velocity of the body 1 (step #1).

Next, the control device 10 acquires a first wheel rotational speed N1, which is the rotational speed of the first wheels 11 (step #2). The first wheel rotational speed N1 can be detected by a rotational speed sensor provided on the body 1, for example.

The control device 10 then determines whether the first wheel rotational speed N1 is less than or equal to a predetermined threshold TH (step #3). If the first wheel rotational speed N1 is less than or equal to the threshold TH (step #3: Yes), a setting coefficient K is set to zero (step #4). As will be described later, the setting coefficient K is used when determining the second wheel torque T2.

On the other hand, if the first wheel rotational speed N1 is larger than the threshold TH (step #3: No), the control device 10 performs processing that depends on the travel state of the body 1 (step #5). Specifically, if it is determined that the body 1 is traveling at constant velocity, the control device 10 sets the setting coefficient K to a predetermined reference value s0 (step #6). Also, if it is determined that the body 1 is accelerating or decelerating, the control device 10 determines whether the first wheels 11 are the wheels W with increased load (step #7). Note that it can be determined whether the body 1 is traveling at constant velocity or accelerating/decelerating based on the change in the first wheel rotational speed N1, for example.

If it is determined that the first wheels 11 are the wheels W with increased load in the case where the body 1 is accelerating or decelerating (step #7: Yes), the control device 10 sets the setting coefficient K to s1, which is smaller than the reference value s0 (step #8). On the other hand, if it is determined that the second wheels 12 are the wheels W with increased load (step #7: No), the control device 10 sets the setting coefficient K to s2, which is larger than the reference value s0 (step #9). Note that, in the present embodiment, the first wheels 11 are the rear wheels and the second wheels 12 are the front wheels, and thus when the first wheels 11 are the wheels W with increased load, the body 1 is decelerating (see FIG. 4), and when the second wheels 12 are the wheels W with increased load, the body 1 is accelerating (see FIG. 3).

The setting coefficient K can be calculated by the following equation (1), for example.

$$K=(P2/P1)\cdot(RT1/RT2) \quad (1)$$

Here, terms of the above equation are as follows (See FIGS. 3 and 4):

P1: Vertical downward load acting on first wheels 11

P2: Vertical downward load acting on second wheels 12

RT1: Rated torque of first drive unit 2

RT2: Rated torque of second drive unit 3

The load P2 can be calculated by the following equation (2), for example.

$$P2=M\cdot(WB-WB2+H\cdot\alpha)/WB \quad (2)$$

Here, terms of the above equation are as follows (See FIGS. 3 and 4):

M: Total weight of body 1

WB: Distance between rotation axis of first wheels 11 and rotation axis of the second wheels 12 (wheelbase)

WB2: Horizontal distance between rotation shaft of second wheels 12 and center of gravity G of body 1

H: Vertical distance between upper surface of traveling rail 5 and center of gravity G of body 1

α: Acceleration of body 1

The load P1 can be calculated by the following equation (3), for example.

$$P1=M-P2 \quad (3)$$

After the setting coefficient K has been set, the control device 10 determines the second wheel torque T2 based on multiplication of the first wheel torque T1 by the setting coefficient K (step #10). In the present embodiment, the control device 10 calculates a value obtained by multiplying the ratio of the first wheel torque T1 to the rated torque of the first drive device 2 by the setting coefficient K as the ratio of the second wheel torque T2 to the rated torque of the second drive device 3.

As described above, while the body 1 is traveling at constant velocity, the setting coefficient K is set to the predetermined reference value s0. On the other hand, while the body 1 is accelerating or decelerating, the setting coefficient K is set to s1, which is smaller than the reference value s0, when the first wheels 11 are the wheels W with increased load, and the setting coefficient K is set to s2, which is larger than the reference value s0, when the second wheels 12 are the wheels W with increased load.

Also, as described above, the second wheel torque T2 is determined based on multiplication of the first wheel torque T1 by the setting coefficient K. Thus, if the body 1 is accelerating or decelerating and the first wheels 11 are the wheels W with increased load, the second wheel torque T2 will be lower than while the body 1 is traveling at constant velocity. On the other hand, if the body 1 is accelerating or decelerating and the second wheels 12 are the wheels W with increased load, the second wheel torque T2 will be higher than while the body 1 is traveling at constant velocity. That is, a torque ratio R of the wheels W with increased load, which is the ratio of the torque that is transmitted to the wheels W with increased load to the sum of the first wheel torque T1 and the second wheel torque T2, is higher while the body 1 is accelerating and decelerating than while the body 1 is traveling at constant velocity.

In this way, the control device 10 controls the first drive device 2 and the second drive device 3 in such a manner that the torque ratio R of the wheels W with increased load is higher while the body 1 is accelerating and decelerating than while the body 1 is traveling at constant velocity.

In the present embodiment, the control device 10 controls the first drive device 2 and the second drive device 3 in such a manner that the torque ratio R of the wheels W with increased load is higher while the body 1 is accelerating and decelerating than while the body 1 is traveling at constant velocity, within a range in which slippage between the wheels W with increased load and the travel rails 5 is not greater than while the body 1 is traveling at constant velocity.

Also, in the present embodiment, the control device 10 controls the first drive device 2 and the second drive device 3 to continuously or incrementally increases the torque ratio R of the wheels W with increased load, as the absolute value of the acceleration α of the body 1 increases.

Figure 6:
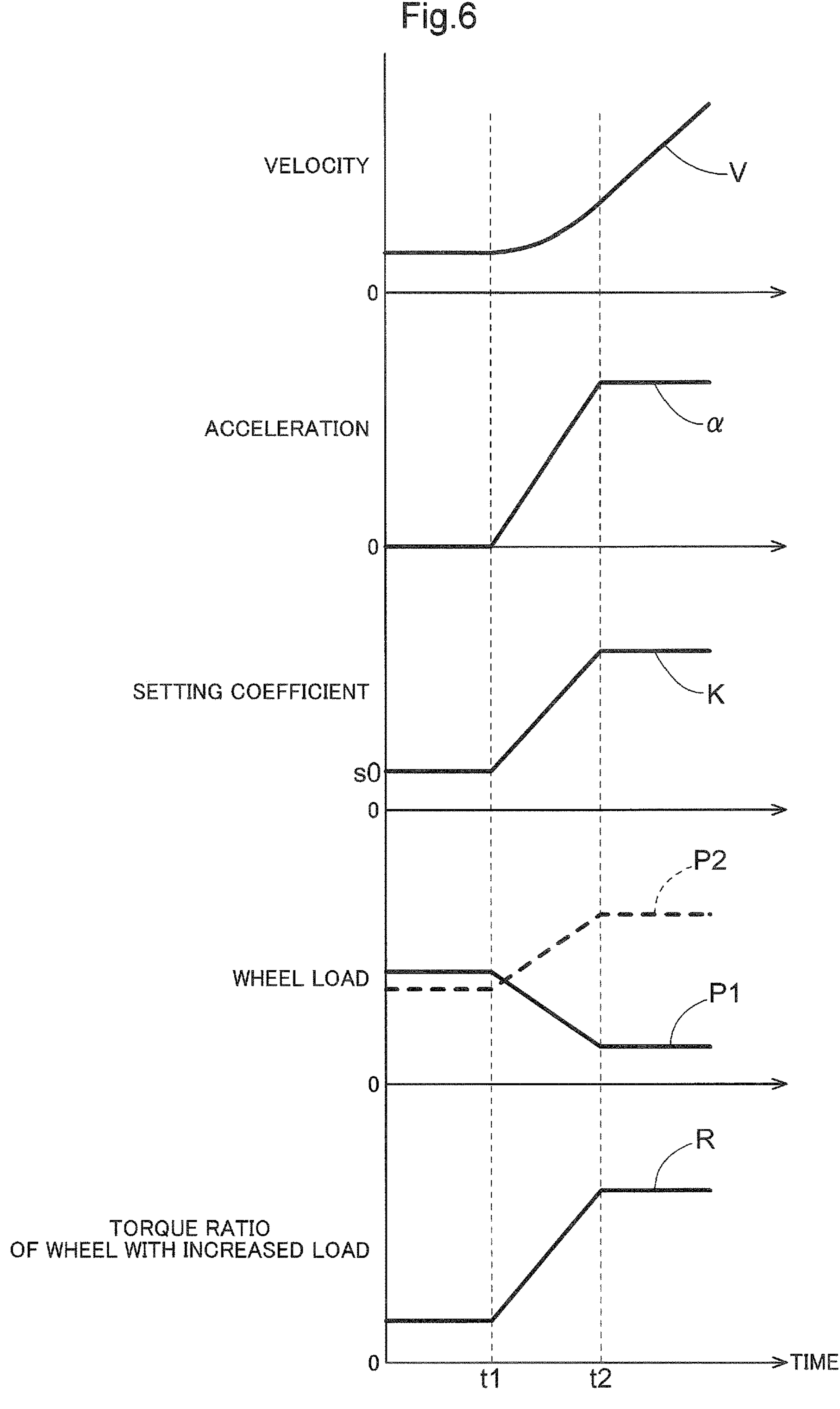
FIG. 6 is a time chart showing an example of control processing by the control device while accelerating the body from travel at constant velocity.
Figure 7:
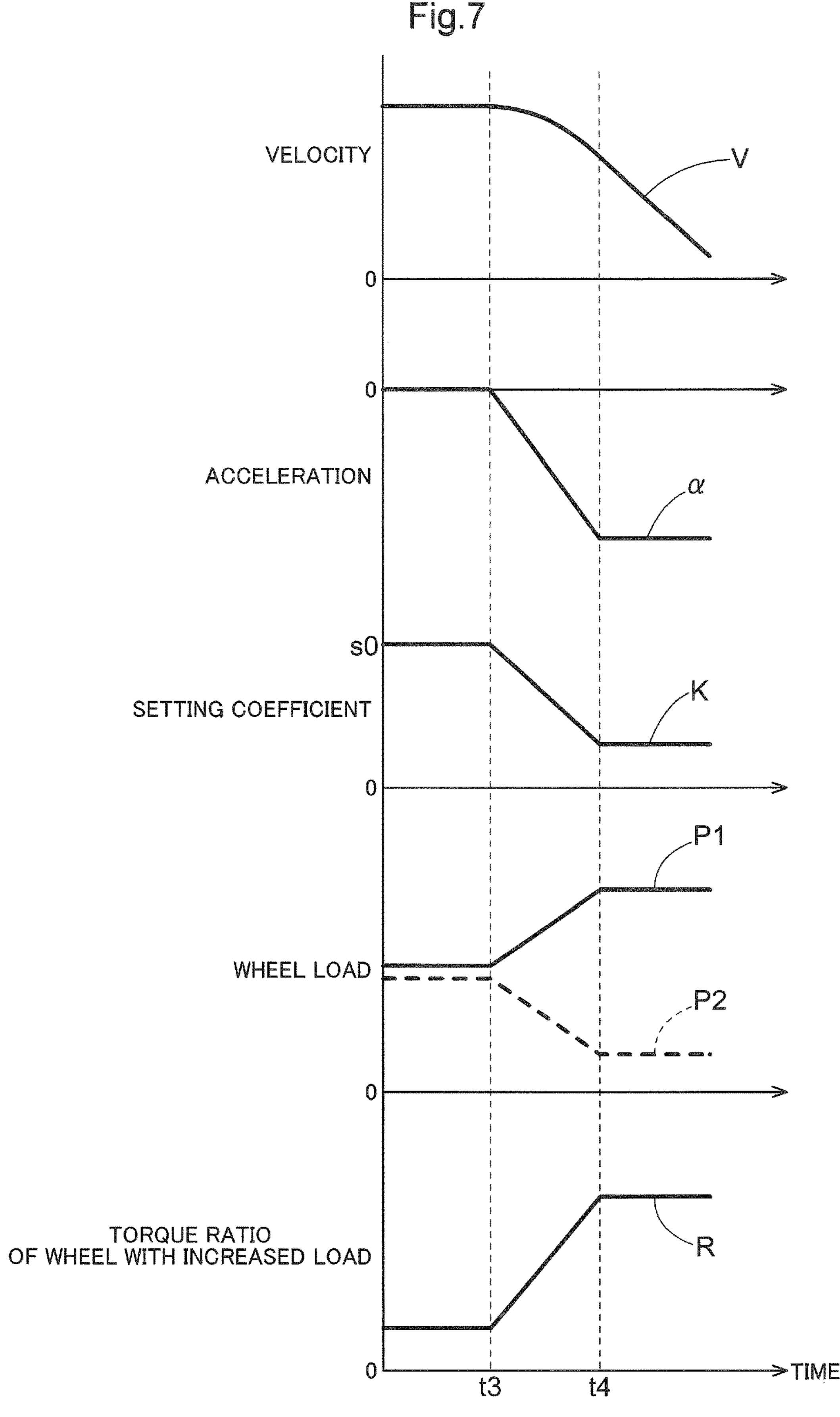
FIG. 7 is a time chart showing an example of control processing by the control device while decelerating the body from travel at constant velocity.

FIG. 6 is a time chart showing an example of control processing by the control device 10 while accelerating the body 1 from travel at constant velocity. FIG. 7 is a time chart showing an example of control processing by the control device 10 while decelerating the body 1 from travel at constant velocity.

As shown in FIG. 6, the control device 10 keeps a travel velocity V of the body 1 constant, that is, causes the body 1 to travel at a constant velocity, by keeping the acceleration α of the body 1 at zero, in the period up to time t1. Thus, the vertical downward load P1 acting on the first wheels 11 and the vertical downward load P2 acting on the second wheels 12 are both kept constant in the period up to time t1.

Also, in the period up to time t1, the body 1 is traveling at constant velocity as described above, and thus the control device 10 keeps the setting coefficient K at the reference value s0. This results in the torque ratio R of the wheels W with increased load being kept constant in the period up to time t1.

The control device 10 increases the acceleration α from zero to the target acceleration, in the period from time t1 to time t2. Thus, in the period from time t1 to time t2, the vertical downward load P1 acting on the first wheels 11 decreases and the vertical downward load P2 acting on the second wheels 12 increases.

At this time, in the present example, the control device 10 smooths the change in the acceleration α with the moving average in a predetermined setting period. Specifically, in the present example, the control device 10 controls the transport vehicle 100, based on a moving average command that is obtained with the moving average of a reference command in the setting period, with a command (e.g., position command or velocity command) for changing the acceleration α instantaneously (stepwise) from zero to the target acceleration at time t1 as the reference command. Thus, in the present example, the acceleration α increases linearly in the period from time t1 to time t2 (time after setting period has elapsed from time t1).

Also, the control device 10 changes the setting coefficient K in response to a change in the acceleration α. Here, the control device 10 increases the setting coefficient K in response to an increase in the acceleration α. At this time, in the present example, the control device 10 smooths the change in the setting coefficient K with the moving average in a period of identical length to the setting period. Also, the control device 10 matches the change period of the setting coefficient K to the change period of the acceleration α. Specifically, in the present example, the control device 10 sets the setting coefficient K, in accordance with a moving average pattern that is obtained with the moving average of a reference pattern in a period of identical length to the setting period, with a change pattern of the setting coefficient K, in which the setting coefficient K changes instantaneously from the setting value when the acceleration α is zero at time t1 (e.g., value calculated by equation (1); this similarly applies below) to the setting value when the acceleration α is the target acceleration, as the reference pattern. Thus, in the present example, the setting coefficient K increases linearly in the period from time t1 to time t2. Note that, in the present example, the value of the setting coefficient K from time t1 onward corresponds to s2, which is larger than the reference value s0.

As described above, in the present embodiment, the first wheel torque T1 is determined based on at least either the target position or target velocity of the body 1, and the second wheel torque T2 is determined based on multiplication of the determined first wheel torque T1 by the setting coefficient K. Thus, in the present embodiment, the acceleration α of the body 1 is a value that depends on the first wheel torque T1. The control device 10 matches the change period of the setting coefficient K to the change period of the first wheel torque T1 in this way when changing the first wheel torque T1. Also, when changing the first wheel torque T1, the control device 10 smooths the change in the first wheel torque T1 with the moving average in a predetermined setting period, and smooths the change in the setting coefficient K with the moving average in a period of identical length to the setting period.

The torque ratio R of the wheels W with increased load also increases with the increase in the setting coefficient K that depends on the increase in the acceleration α, in the period from time t1 to time t2. In the present example, the torque ratio R of the wheels W with increased load also increases linearly, as the acceleration α increases linearly, in the period from time t1 to time t2. That is, the torque ratio R of the wheels W with increased load continuously increases, as the absolute value of the acceleration α increases.

The control device 10 keeps the acceleration α constant in the period from time t2 onward. Thus, the vertical downward load P1 acting on the first wheels 11 and the vertical downward load P2 acting on the second wheels 12 are both kept constant in the period from time t2 onward.

Also, the control device 10 keeps the setting coefficient K constant in the period from time t2 onward. This results in the torque ratio R of the wheels W with increased load being kept constant in the period from time t2 onward.

As shown in FIG. 7, the control device 10 keeps the travel velocity V of the body 1 constant, that is, causes the body 1 to travel at a constant velocity, by keeping the acceleration α of the body 1 at zero in the period up to time t3. Thus, the vertical downward load P1 acting on the first wheels 11 and the vertical downward load P2 acting on the second wheels 12 are both kept constant in the period up to time t3.

Also, in the period up to time t3, the body 1 is traveling at constant velocity as described above, and thus the control device 10 keeps the setting coefficient K at the reference value s0. This results in the torque ratio R of the wheels W with increased load being kept constant in the period up to time t3.

The control device 10 reduces the acceleration α from zero to the target acceleration in the period from time t3 to time t4. Thus, in the period from time t3 to time t4, the vertical downward load P1 acting on the first wheels 11 increases and the vertical downward load P2 acting on the second wheels 12 decreases.

At this time, in the present example, the control device 10 smooths the change in the acceleration α with the moving average in a predetermined setting period. Specifically, in the present example, the control device 10 controls the transport vehicle 100, based on a moving average command that is obtained with the moving average of a reference command in the setting period, with a command (e.g., position command or velocity command) for changing the acceleration α instantaneously (stepwise) from zero to the target acceleration at time t3 as the reference command. Thus, in the present example, the acceleration α decreases linearly in the period from time t3 to time t4 (time after setting period has elapsed from time t3).

Also, the control device 10 changes the setting coefficient K in response to a change in the acceleration α. Here, the control device 10 reduces the setting coefficient K in response to the decrease in the acceleration α. At this time, in the present example, the control device 10 smooths the change in the setting coefficient K with the moving average in a period of identical length to the setting period. Also, the control device 10 matches the change period of the setting coefficient K to the change period of the acceleration α. Specifically, in the present example, the control device 10 sets the setting coefficient K, in accordance with a moving average pattern that is obtained with the moving average of a reference pattern in a period of identical length to the setting period, with a change pattern of the setting coefficient K, in which the setting coefficient K changes instantaneously from the setting value when the acceleration α is zero at time t3 to the setting value when the acceleration α is the target acceleration, as the reference pattern. Thus, in the present example, the setting coefficient K decreases linearly in the period from time t3 to time t4. Note that, in the present example, the value of the setting coefficient K from time t3 onward corresponds to s 1, which is smaller than the reference value s0.

The torque ratio R of the wheels W with increased load increases with the decrease in the setting coefficient K that depends on the decrease in the acceleration α, in the period from time t3 to time t4. In the present example, the torque ratio R of the wheels W with increased load increases linearly, as the acceleration α decreases linearly in the period from time t3 to time t4. That is, the torque ratio R of the wheels W with increased load continuously increases, as the absolute value of the acceleration a increases.

The control device 10 keeps the acceleration α constant in the period from time t4 onward. Thus, the vertical downward load P1 acting on the first wheels 11 and the vertical downward load P2 acting on the second wheels 12 are both kept constant in the period from time t4 onward.

Also, the control device 10 keeps the setting coefficient K constant in the period from time t4 onward. This results in the torque ratio R of the wheels W with increased load being kept constant in the period from time t4 onward.

Other Embodiments (1) In the above embodiment, a configuration in which the torque ratio R of the wheels W with increased load is changed, by changing the setting coefficient K according to the travel state of the body 1, and determining the second wheel torque T2 based on multiplication of the first wheel torque T1 by the setting coefficient K, that is, a configuration in which the torque ratio R of the wheels W with increased load is changed, by changing the second wheel torque T2 according to the travel state of the body 1, with the first wheel torque T1 as a reference, is described as an example. However, the present invention is not limited to such a configuration, and, for example, the torque ratio R of the wheels W with increased load may be changed, by increasing one of the first wheel torque T1 and the second wheel torque T2 and reducing the other thereof, according to the travel state of the body 1.

(2) In the above embodiment, a configuration in which the torque ratio R of the wheels W with increased load is continuously increased as the absolute value of the acceleration α increases (see FIGS. 6 and 7) is described as an example. However, the present invention is not limited to such a configuration, and the torque ratio R of the wheels W may be incrementally increased, as the absolute value of the acceleration α increases.

(3) In the above embodiment, a configuration in which the center of gravity G of the body 1 is on the lower side Z2 with respect to the travel rails 5 regardless of whether the holding section 13 is holding the article A is described as an example.

However, the present invention is not limited to such a configuration, and, for example, the center of gravity G of the body 1 may be on the upper side Z1 with respect to the travel rails 5, while the holding portion 13 is not holding the article A. Alternatively, the center of gravity G of the body 1 may be on the upper side Z1 with respect to the travel rails 5, regardless of whether the holding section 13 is holding the article A. Note that, in the case where the center of gravity G of the body 1 is on the upper side Z1 with respect to the travel rails 5, one of the first wheels 11 and the second wheels 12 that is on the rear side X2 will be the wheels W with increased load while the body 1 is accelerating, and one of the first wheels 11 and the second wheels 12 that is on the front side X1 will be the wheels W with increased load while the body 1 is decelerating.

(4) In the above embodiment, a configuration in which the setting coefficient K is calculated by equation (1) is described as an example. However, the present invention is not limited to such a configuration, and the setting coefficient K may be calculated by an equation created based on testing or the like that is different from equation (1).

(5) In the above embodiment, a configuration in which the change period of the setting coefficient K is matched to the change period of the first wheel torque T1 (acceleration $\alpha$) is described as an example. However, the present invention is not limited to such a configuration, and, for example, the change period of the setting coefficient K may be partially matched rather than fully matched to the change period of the first wheel torque T1.

(6) In the above embodiment, a configuration in which the change in the first wheel torque T1 (acceleration $\alpha$) is smoothed with the moving average in a predetermined setting period and the change in the setting coefficient K is smoothed with the moving average in a period of identical length to the setting period is given as an example. However, the present invention is not limited to such a configuration, and, for example, the value of the setting coefficient K in the change period of the first wheel torque T1 (acceleration $\alpha$) may be set, not with a moving average that is based on a value calculated with a setting value that depends on the acceleration $\alpha$ at the start of the change period (e.g., the value calculated by the above equation (1); this similarly applies below) and a setting value that depends on the acceleration $\alpha$ at the end of the change period, but to a setting value that depends on the acceleration $\alpha$ at various points in time within the change period. Also, a configuration may be adopted in which at least either the change in the first wheel torque T1 or the change in the setting coefficient K is not smoothed.

(7) Note that the configuration disclosed in the aforementioned embodiment can also be applied in combination with the configurations disclosed in the other embodiments, provided there are no inconsistencies. As for the remaining configuration, the embodiments disclosed herein are merely illustrative in all respects. Accordingly, various modifications can be made as appropriate, without departing from the spirit of the disclosure.

Summary of Embodiments

Hereinafter, a summary of the transport vehicle described above will be described.

The transport vehicle is:

A transport vehicle configured to travel in a travel direction along a travel rail, including:

- a body including a first wheel and a second wheel disposed at different positions to each other in the travel direction and configured to roll on the travel rail;
- a first drive device configured to drive the first wheel;
- a second drive device configured to drive the second wheel; and
- a control device configured to control the first drive device and the second drive device,
- wherein the control device controls the first drive device and the second drive device in such a manner that a torque ratio of a wheel with increased load, which is a ratio of a torque transmitted to the wheel with increased load to a sum of a first wheel torque and a second wheel torque, is higher while the body is accelerating and decelerating than while the body is traveling at constant velocity,
- where the first wheel torque is a torque transmitted from the first drive device to the first wheel, the second wheel torque is a torque transmitted from the second drive device to the second wheel, and the wheel with increased load is one of the first wheel and the second wheel that is subjected to an increase in vertical downward load that increases in response to acceleration or deceleration of the body.

According to this characteristic configuration, the first wheel torque and the second wheel torque can be appropriately controlled, in response to an increase or decrease in the vertical downward loads acting on the first wheel and the second wheel while the body is accelerating or decelerating. Wheel slippage is thereby readily suppressed while accelerating or decelerating the body. Also, acceleration or deceleration of the body is readily performed with large changes in velocity, thus readily enhancing the efficiency with which articles are transported.

Note that since wheel slippage is readily suppressed while accelerating or decelerating the body according to this configuration, as described above, the occurrence of dust particles can be suppressed. Accordingly, the transport vehicle is suitable for use in cleanrooms.

Here, preferably, the control device controls the first drive device and the second drive device in such a manner that the torque ratio of the wheel with increased load is higher while the body is accelerating and decelerating than while the body is traveling at constant velocity, within a range in which slippage between the wheel with increased load and the travel rail is not greater than while the body is traveling at constant velocity.

According to this configuration, the body can be caused to travel by transmitting a relatively large torque to the wheel with increased load, within a range in which wheel slippage can be suppressed, while the body is accelerating or decelerating.

Also, preferably, the control device continuously or incrementally increases the torque ratio of the wheel with increased load, as an absolute value of acceleration of the body increases.

The vertical downward load acting on the wheel with increased load gradually increases, as the size of the absolute value of the acceleration of the body increases. According to the above configuration, the torque ratio of the wheel with increased load is continuously or incrementally increased, in response to the vertical downward load acting on the wheel with increased load increasing. The body can thereby be caused to travel by transmitting a large torque efficiently to the wheel with increased load, while the body is accelerating or decelerating.

Also, preferably, the body further includes a holding section configured to hold an article to be transported, the body has a center of gravity lower than the travel rail while the holding section is holding the article, the wheel with increased load while the body is accelerating is one of the first wheel and the second wheel that is on a front side in the travel direction, and the wheel with increased load while the body is decelerating is one of the first wheel and the second wheel that is on a rear side in the travel direction.

According to this configuration, the torque ratio of the wheel with increased load can be appropriately increased while the body is accelerating or decelerating, in the case where the center of gravity of the body including the article held by the holding section is lower than the rail. Accordingly, the body can be caused to travel by transmitting a relatively large torque to the wheel with increased load, while the body is accelerating or decelerating.

Also, preferably, the control device:

determines the first wheel torque based on at least either a target position or a target velocity of the body, and determines the second wheel torque based on multiplication of the determined first wheel torque by a setting coefficient, sets the setting coefficient to a predetermined reference value, while the body is traveling at constant velocity, and sets the setting coefficient to a value smaller than the reference value in response to the first wheel being the wheel with increased load, and to a value larger than the reference value in response to the second wheel being the wheel with increased load, while the body is accelerating or decelerating.

According to this configuration, torque can be appropriately distributed to the first wheel and second wheel, both while the body is traveling at constant velocity and accelerating/decelerating.

Also, preferably, the control device sets the setting coefficient to zero in response to a rotational speed of the first wheel being less than or equal to a predetermined threshold.

According to this configuration, the torque of the second wheel will be zero, when the rotational speed of the first wheel is less than or equal to the threshold. Energy consumption of the second drive device while the body is stopped can thereby be suppressed.

Also, preferably, the control device, when changing the first wheel torque, matches a change period of the setting coefficient to a change period of the first wheel torque.

According to this configuration, the setting coefficient can be readily set to an appropriate value at various points in time in the period in which the acceleration of the body changes. Torque can thereby be appropriately distributed to the first wheel and second wheel, while the body is accelerating or decelerating.

Also, preferably, the control device, when changing the first wheel torque, smooths a change in the first wheel torque with a moving average in a predetermined setting period, and smooths a change in the setting coefficient with a moving average in a period of identical length to the setting period.

According to this configuration, sudden changes in the acceleration of the body can be avoided, and sudden changes in the setting coefficient can be avoided. The behavior of the body is thereby readily stabilized, thus enabling vibration of the body in the traveling direction to be suppressed.

INDUSTRIAL APPLICABILITY

The technology according to the present disclosure can be utilized in transport vehicles that travel along travel rails.

What is claimed is:

1. A transport vehicle configured to travel in a travel direction along a travel rail, comprising:

a body comprising a first wheel and a second wheel disposed at different positions to each other in the travel direction and configured to roll on the travel rail;

a first drive device configured to drive the first wheel;

a second drive device configured to drive the second wheel; and a control device configured to control the first drive device and the second drive device, wherein the control device controls the first drive device and the second drive device in such a manner that a torque ratio of a wheel with increased load, which is a ratio of a torque transmitted to the wheel with increased load to a sum of a first wheel torque and a second wheel torque, is higher while the body is accelerating and decelerating than while the body is traveling at constant velocity, wherein where the first wheel torque is a torque transmitted from the first drive device to the first wheel, the second wheel torque is a torque transmitted from the second drive device to the second wheel, and the wheel with increased load is one of the first wheel and the second wheel that is subjected to an increase in vertical downward load that increases in response to acceleration or deceleration of the body, and wherein the control device:

determines the second wheel torque based on multiplication of the first wheel torque by a setting coefficient;

sets the setting coefficient to a predetermined reference value, while the body is traveling at constant velocity; and sets the setting coefficient to a value smaller than the reference value in response to the first wheel being the wheel with increased load, and to a value larger than the reference value in response to the second wheel being the wheel with increased load, while the body is accelerating or decelerating.

2. The transport vehicle according to claim 1, wherein:

the control device controls the first drive device and the second drive device in such a manner that the torque ratio of the wheel with increased load is higher while the body is accelerating and decelerating than while the body is traveling at constant velocity, within a range in which slippage between the wheel with increased load and the travel rail is not greater than while the body is traveling at constant velocity.

3. The transport vehicle according to claim 1, wherein:

the control device continuously or incrementally increases the torque ratio of the wheel with increased load, as an absolute value of acceleration of the body increases.

4. The transport vehicle according to claim 1, wherein:

the body further comprises a holding section configured to hold an article to be transported, the body has a center of gravity lower than the travel rail while the holding section is holding the article, the wheel with increased load while the body is accelerating is one of the first wheel and the second wheel that is on a front side in the travel direction, and the wheel with increased load while the body is decelerating is one of the first wheel and the second wheel that is on a rear side in the travel direction.

5. The transport vehicle according to claim 1, wherein the control device:

determines the first wheel torque based on at least either a target position or a target velocity of the body.

6. The transport vehicle according to claim 5, wherein: the control device sets the setting coefficient to zero in response to a rotational speed of the first wheel being less than or equal to a predetermined threshold.

7. The transport vehicle according to claim 5, wherein: the control device, when changing the first wheel torque, matches a change period of the setting coefficient to a change period of the first wheel torque.

8. The transport vehicle according to claim 7, wherein: the control device, when changing the first wheel torque, smooths a change in the first wheel torque with a moving average in a predetermined setting period, and smooths a change in the setting coefficient with a moving average in a period of identical length to the setting period.

* * * * *